I. P. MAGOON.

Locomotives.

No. 5,900. Reissued June 2, 1874.

Attest
O. T. Garey
W. J. Cambridge

Israel Putnam Magoon Inventor

A.M. PHOTO-LITHOGRAPHIC Co. N.Y. (OSBORNE'S PROCESS.)

UNITED STATES PATENT OFFICE.

ISRAEL P. MAGOON, OF ST. JOHNSBURY, VERMONT, ASSIGNOR TO CHARLES A. SHAW, OF BOSTON, MASSACHUSETTS.

IMPROVEMENT IN LOCOMOTIVES.

Specification forming part of Letters Patent No. 117,308, dated July 25, 1871; reissue No. 5,900, dated June 2, 1874; application filed December 11, 1873.

*To all whom it may concern:*

Be it known that I, ISRAEL P. MAGOON, of St. Johnsbury, in the county of Caledonia, State of Vermont, have invented a certain new and useful Improvement in Locomotives, of which the following is a description sufficiently full, clear, and exact to enable any person skilled in the art or science to which my invention appertains to make and use the same, reference being had to the accompanying drawing forming a part of this specification, in which—

Figure 1:
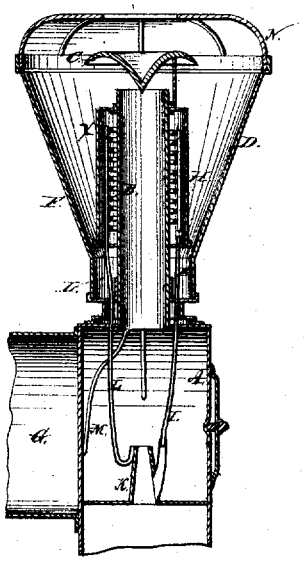
Figure 2:
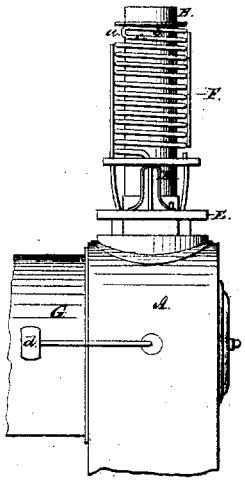
Figure 3:
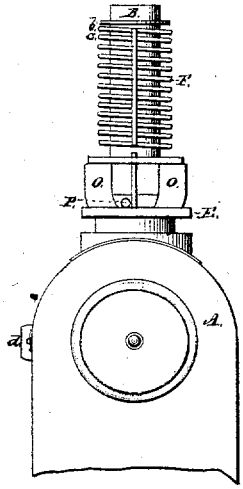

Figure 1 is a vertical sectional view of the smoke-box and stack of a locomotive steam-engine provided with my invention. Fig. 2 is a sectional side view. Fig. 3 is a sectional front view.

The last-named figures of the drawing represent the smoke box and stack of such a locomotive without the deflector, the insulating or steam chamber, and the outer or main chimney, and exhibit the water-heating coil of the feed-water pipe, and curved guides, all hereinafter more fully described.

My invention relates to that class of locomotive steam-engines in which the feed-water is heated on its passage from the tender to the boiler by means of the exhaust steam; and consists, primarily, in a feed-water pipe coiled around the chimney or eduction-pipe within the stack of the locomotive, and inclosed in a steam chamber or insulator, into which the exhaust steam is thrown unmixed with smoke; secondly, in a feed-water pipe constructed and arranged in a peculiar manner, in combination with a closed steam-chamber; thirdly, in a pipe arranged to lead from the steam-chamber so as to discharge the waste steam from the chamber into the chimney to promote the draft of the engine; also, in the arrangement of the branch pipe, all as hereinafter more fully set forth and described.

In Fig. 1 of drawing, A denotes the smoke-box, and B the eduction pipe or chimney, which is surmounted by a cone or deflector, C, that serves to deflect the discharged smoke and cinders downward into the outer or auxiliary chimney D, which is provided with a gauze bonnet or netting, N, in the usual manner. This outer chimney is an inverted conic frustum surrounding the inner chimney and its adjuncts, and is supported on a base-plate, E, which encompasses the eduction-pipe or main chimney B. Encompassing the chimney B is a duplex coil of pipe, F, Fig. 2. This coil consists of a long tube bent at its middle, as shown at *a*, so that the halves *b c* are in parallelism, the whole being coiled in a helix around the smoke-pipe or chimney B. One branch of the helix is extended downward into the smoke-box, thence out of it at its sides, and thence into the check-valve case *d*, thus communicating with the boiler G. The other branch also passes down into the smoke-box, and thence out, and is connected with the force-pump of the engine, so that the water drawn by the pump from the tank of the tender is forced upward through one branch of the coil of pipe, and downward through the other into the boiler. The coil F is inclosed by the chamber H, Fig. 1, which chamber is arranged around the chimney B, and forms an insulator that prevents the smoke and cinders in passing through the pipe B from coming into contact with said coil, the outer wall of the chamber being formed of the plate X, and the inner wall by the pipe B. The main exhaust-pipe K is provided with a branch pipe, I, which branch is connected by a steam-tight connection with the chamber H. There is also a pipe, L, extending from the upper part of said chamber through the bottom of the same by a steam-tight joint into the smoke-box, where it is bent or turned upward, so as to discharge steam passing through it into the pipe or chimney B, and thence out of the stack, thus, at the same time, accelerating the draft of the chimney. A drip-pipe, M, is provided, which conveys the condensed steam or water from the chamber H to the ground. With the exception of the openings for the inlet-pipe I, outlet-pipe L, the drip-pipe M, and the pipes leading respectively to the pump and boiler, the chamber H has no opening, and is steam-tight, completely insulating or shutting in the coils F from the outer air. Underneath the bottom of the chamber H, and extended down to the bottom of the outer chimney on each of two opposite sides of the inner chimney, is an arched deflector or guide, O, formed as represented, there being holes or passages P between the deflectors, and through the inner chimney. The object of these guides is to direct into the inner chimney the cinders and sparks that may gather in the lower part of the outer chimney, they escaping from the latter through the opening P.

For engines in which anthracite coal or coke is used for fuel the outer chimney, its gauze bonnet, and the deflector on the top of the inner chimney, will not be needed. The guides O O are also only necessary for engines using bituminous coal or wood.

From the foregoing it will be readily seen and understood by all conversant with such matters that, as the exhaust steam is discharged from the cylinders of the engine into the main exhaust-pipe K, Fig. 1, a part of said steam will be thrown into the branch or inlet-pipe I, and will pass into and through the chamber H, thence through the outlet-pipe L into the chimney B, and so out of the stack of the locomotive. The feed-water, being at the same time forced by the pump through the coil F in the chamber H, will be heated to a high degree of temperature on its way to the boiler by means of the steam let or thrown into said chamber, as described.

The great advantages arising from the use of hot water heated by exhaust steam over cold for supplying or feeding the boilers of locomotive steam-engines are too well known and understood by all practical engineers and railroad men to require a detailed explanation, the saving of fuel, "even steam," and the avoidance of the evils arising from the sudden contraction of the flues of the boiler, where cold water is used, being among the principal.

On the 29th day of March, 1870, Letters Patent of the United States numbered 101,287, were granted to me for an improvement in locomotive steam-engines, in which patent a feed-water heater is described, consisting in part of a coiled feed-water pipe disposed in the stack of the locomotive, in connection with a screen or semi-insulator, open both at the top and bottom, and arranged in such a manner that both the exhaust steam and smoke escaping out of the chimney are discharged directly against the coils of the feed-water pipe.

In practice I have found that the method described in said patent is attended with many difficulties, as the coil, not being insulated in a closed chamber, soon becomes wet from the steam and coated with cinders and fine carbonaceous particles deposited from the smoke, thus, to a great extent, preventing the effective heating of the water.

I am also aware that Letters Patent of the United States were granted to one Peter S. Ebbert, for an improvement in locomotive steam-engines, which last-named patent bears date May 5, 1857, and is numbered 17,208, in which a feed-water-heating mechanism is described, consisting in part of a pipe disposed in a chamber in the smoke-stack of the locomotive; but said pipe in the apparatus of said Ebbert is in short sections or pieces, arranged vertically in said chamber, each section or piece being connected at the top and bottom with an adjoining piece by a U-shaped or conical coupling in such a manner that, commencing at the inlet, each section or vertical piece of pipe opens into the next succeeding one through the whole series around to the outlet. But I have found that inclined pipes work much better than vertical ones, and that the nearer the pipes are brought to a horizontal position, the easier it is to force the water through them, a coiled feed-water pipe and especially this form of pipe F presenting many advantages over any other form with which I am conversant.

It will be understood that in my device each of the cylinders of the engine is provided with an exhaust-pipe in the usual manner, and that these pipes are united to form the main exhaust pipe or nozzle K; but in the apparatus described in the patent of said Ebbert, said main exhaust-pipes are not united, and there are two branch exhaust-pipes leading from the respective main exhaust-pipes to the heater. I have found that this arrangement of the pipes is objectionable, as there is more condensation of the steam in the heating-chamber and in the pipes where the steam is divided in that manner, than occurs when it is all taken through one pipe, as in my device —that is to say, I have found it preferable to unite the main exhaust-pipes leading from the cylinders of the engine into one pipe or nozzle, K, before the branch is connected with the same, as this gives a nearly continuous flow of steam through the pipe I into the chamber H and materially reduces condensation.

I am aware that in the English Patent numbered 1,299, for 1853, a coiled pipe is shown, through which the feed-water passes up in one helix thereof, and down in the other; but said pipe is not insulated or inclosed in a steam-heating chamber, and is arranged in an essentially different manner from mine; I therefore do not herein claim such a pipe when in and of itself considered. Neither do I herein claim anything already secured to me by said patent of 1870, or anything shown and described therein and not so secured, when in and of itself considered; neither do I herein claim anything shown or described in said patent of 1857, when in and of itself considered; but What I do claim is—

1. In the feed-water-heating apparatus of a locomotive steam-engine, the following instrumentalities, to wit: A closed heating-chamber or insulator disposed in the stack of the engine, and provided with an inlet-pipe for taking exhaust steam from the cylinder, an outlet-pipe for discharging such steam, and a drip-pipe for carrying off the condensed water, in combination with a feed-water pipe, one end of which is connected with the pump and the other with the boiler, and a section of which is arranged in coils around the chimney of the locomotive within such chamber, substantially as and for the purposes set forth and specified.

2. The coil F, consisting of a long tube bent at its middle, as shown at *a*, and coiled in a helix around the smoke-pipe and arranged within the steam-chamber H, substantially as and for the purpose specified.

3. The pipe L, arranged to lead from the chamber H, so as to discharge the waste steam from the chamber directly into the chimney to promote the draft thereof, substantially as set forth and specified.

4. In combination with the chamber H, the branch pipe I, branching off or leading from the main pipe or nozzle K at a point between where the respective exhaust-pipes from the cylinders are united in said main pipe, and where said main pipe or nozzle discharges steam directly to promote the draft, substantially as and for the purpose specified.

Witnesses: ISRAEL P. MAGOON.
H. E. METCALF,
F. S. ROBINSON.